United States Patent [19]

Bret

[11] Patent Number: 4,487,742

[45] Date of Patent: Dec. 11, 1984

[54] FAST NEUTRON NUCLEAR REACTOR WITH INTERNAL CAPILLARY STRUCTURE PIPING

[75] Inventor: Antoine Bret, Aix En Provence, France

[73] Assignee: Commissariat a l'Energie Atomique, Paris, France

[21] Appl. No.: 377,018

[22] Filed: May 11, 1982

[30] Foreign Application Priority Data

May 22, 1981 [FR] France .................. 81 10227

[51] Int. Cl.³ ............................................. G21C 15/18
[52] U.S. Cl. ................................. 376/298; 376/367; 376/403; 376/405; 165/DIG. 14
[58] Field of Search ............. 376/298, 299, 367, 403, 376/404, 405; 165/104.14, 134 R, DIG. 14

[56] References Cited

U.S. PATENT DOCUMENTS

| | | |
|---|---|---|
| 2,961,393 | 11/1960 | Monson . |
| 3,393,127 | 7/1968 | Detman et al. .............. 376/403 X |
| 3,830,063 | 8/1974 | Morgan ..................... 165/DIG. 14 |
| 3,866,424 | 2/1975 | Busey ....................... 165/104.14 X |
| 3,935,063 | 1/1976 | Dunckel . |
| 4,051,892 | 10/1977 | Reinsch ..................... 376/299 X |
| 4,115,192 | 9/1978 | Jogand ....................... 376/298 |
| 4,191,246 | 4/1980 | Cassell ....................... 165/134 R |
| 4,312,703 | 1/1982 | Woudstra ................... 376/299 |
| 4,367,194 | 1/1983 | Schenewerk et al. ........ 376/298 X |
| 4,382,907 | 5/1983 | Robin ........................ 376/299 X |

FOREIGN PATENT DOCUMENTS

| | | |
|---|---|---|
| 4218 | 9/1979 | European Pat. Off. . |
| 1480628 | 5/1966 | France . |
| 2171194 | 2/1973 | France . |
| 2179839 | 4/1973 | France . |

Primary Examiner—Peter A. Nelson
Attorney, Agent, or Firm—Kerkam, Stowell, Kondracki & Clarke

[57] ABSTRACT

The invention relates to a fast neutron nuclear reactor equipped with residual power removal devices.

Each device comprises an evaporator incorporating a bundle of tubes in glove finger-like form immersed in the liquid metal contained in the reactor vessel, an adiabatic collector constituted by a pipe traversing the slab sealing the reactor vessel and a condenser in which the heat transfer fluid, such as mercury, contained in said device is condensed by heat exchange with the atmospheric air sucked in through the chimney or flue.

Application to fast neutron nuclear reactors.

9 Claims, 6 Drawing Figures

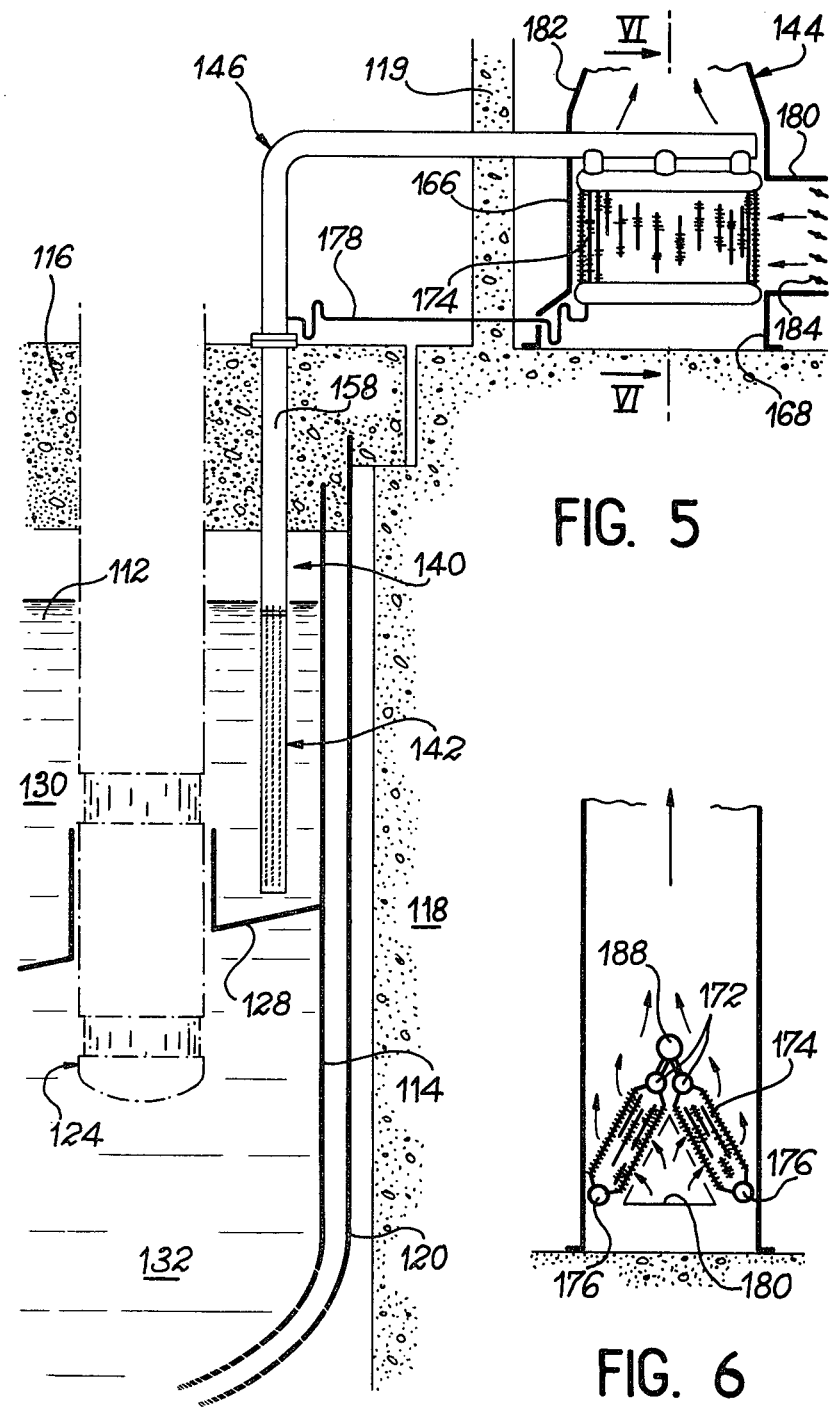

FAST NEUTRON NUCLEAR REACTOR WITH INTERNAL CAPILLARY STRUCTURE PIPING

BACKGROUND OF THE INVENTION

The invention relates to a fast neutron nuclear reactor equipped with at least one residual power removal device.

It is known that in a fast neutron reactor, the reactor core is immersed in a predetermined volume of liquid metal (generally sodium) contained in a vertically axed vessel, sealed in its upper part by a horizontal sealing slab. In normal operation, the power given off by the fission reaction in the reactor core is absorbed by the circulation of the liquid metal in a primary circuit incorporating the pre-vacuum pumps and the intermediate exchangers respectively ensuring in operation the continuous circulation and cooling of the liquid metal. In integrated reactors the complete primary circuit is located in the reactor vessel, whereas it passes out of the vessel in the case of a loop-type reactor. In general, the heat extracted from the reactor core by the liquid metal of the primary circuit is transferred to a liquid metal (generally sodium) circulating in a secondary circuit comprising steam generators which, in turn, transfer the heat to a water/steam circuit operating the turbines of an electricity generating plant.

It is obvious that in the case of an operational accident leading to the stoppage of the pre-vacuum pumps, the core in which the fission reactor is immediately stopped due to the dropping of the scram rods, still gives off a large amount of residual calorific power, which should be reliably and effectively eliminated in order to prevent local melting of the core.

For this purpose, it is conventional practice to provide loops or circuits for cooling the reactor when shut down and they comprise heat exchangers directly immersed into the liquid metal contained in the vessel and pumps ensuring the circulation of the liquid metal (generally sodium) circulating in said loops or circuits in order to remove the residual power from the core by means of liquid metal/air exchangers.

Although such shutdown reactor cooling loops or circuits have quite satisfactory operating characteristics, the numerous components (exchangers, expansion vessel, electromagnetic pumps, purification system, sodium storage tanks) located on these loops, as well as the level difference (approximately 18 m) between the exchanger immersed in the sodium and the air exchanger (level difference which is added to the height of the chimney or flue ensuring the cooling of the sodium-air exchanger) make their construction relatively complex and therefore costly. Moreover, the operation of these loops necessitates an external mechanical energy supply at the pumps ensuring the circulation of the liquid metal. From the safety standpoint, this feature is obviously not satisfactory, because it renders these loops ineffective in the case of failure of the electric power supply circuit. Finally, the quantity of heat removed by the shutdown reactor cooling loops must be adjusted as a function of the temperature of the liquid metal in the vessel.

BRIEF SUMMARY OF THE INVENTION

The object of the present invention is a fast neutron nuclear reactor incorporating a novel residual heat removal system and having a capacity comparable to that of the prior art systems, whilst having a simpler construction and therefore involving lower initial costs. The invention also relates to a reactor in which the residual heat removal system operates entirely in natural convection without any external mechanical energy supply, whilst benefiting from a self-regulating effect making it possible to remove an energy quantity proportional to the temperature of the liquid metal in the vessel.

Therefore, the present invention proposes a fast neutron nuclear reactor comprising a vertically axed vessel containing the reactor core and a volume of liquid metal for cooling the same, a horizontal sealing slab sealing the upper part of the vessel, at least one pre-vacuum pump and at least one heat exchanger respectively ensuring in operation the circulation of the liquid metal in the core and its cooling, as well as at least one device for removing the residual power ensuring the cooling of the liquid metal in the case of a stoppage of the pre-vacuum pumps, wherein the residual power removal device comprises an evaporator incorporating a bundle of tubes in glove finger-like form immersed in the liquid metal, so as to pass into the vapour phase a heat transfer fluid initially in the liquid phase, an adiabatic collector of said vapour phase incorporating a pipe traversing the reactor slab and a condenser in which the heat transfer fluid in the vapour phase exchanges its heat with an external cooling fluid and condenses in the liquid phase before dropping again into the evaporator by the adiabatic collector.

As a result of these features, a novel residual heat removal system is obtained, which is based on a thermodynamic evaporation/condensation cycle of a heat transfer fluid such as mercury. This system makes it possible to ensure an axial energy transfer between the evaporator in the liquid metal contained in the vessel and the condenser, cooled e.g. by air which is circulated by means of a chimney or flue, without any external mechanical energy supply, the system operating entirely with natural convection. Furthermore, as a result of a pipe constituting the adiabatic collector connecting the evaporator and the condenser passing through the reactor slab makes it possible to benefit from the reduced diametral dimensions in connection with the slab and a reduced pressure drop between the evaporator and the condenser.

According to a secondary feature of the invention, the wall of the pipe constituting the collector, as well as the wall of each of the tubes of the evaporator internally have a capillary structure piping the heat transfer fluid in the liquid phase, so as to prevent the entrainment of the latter by the fluid in the vapour phase, whilst regularizing its flow towards the evaporator.

Preferably, the upper end of the bundle of tubes is installed on a tube plate constituting the lower end of the adiabatic collector and the upper end of each of the tubes projects over a given height above the tube plate in order to define a buffer reservoir for the heat transfer fluid in the liquid phase. In order to ensure the uniform distribution of the flow of the heat transfer fluid in the liquid phase in each tube, the upper end of the latter projecting above the tube plate can have at least one row of slits and/or holes made on the side wall of the tubes.

The circulation of the liquid metal contained in the vessel around the bundle of tubes of the evaporator can be piped by means of a ferrule surrounding the bundle of tubes, having at least one inlet port at its upper end and open at its lower end to permit the removal of the liquid metal and to permit the free downward expansion of the ferrule and the tube.

According to a first embodiment of the invention, the condenser is supported by the reactor slab and is located within the reactor enclosure. It can then comprise a caisson or box in which are located a toroidal supply or feeding collector connected to the upper end of the pipe constituting the adiabatic collector, a toroidal collector for receiving the condensate positioned below the supply collector and an annular bundle of fin tubes connecting the supply and condensate receiving collectors, the external cooling fluid being atmospheric air which enters the box by a lateral pipe and leaves it by a chimney or flue positioned above the supply collector.

According to a second embodiment of the invention, the condenser is positioned outside the reactor enclosure. It can then comprise a caisson or box in which are located at least one substantially horizontal and rectilinear supply collector connected to the upper end of the pipe constituting the adiabatic collector, two condensate receiving collectors positioned below the supply collector and on either side of the vertical plane passing through the latter and two planar bundles of fin tubes connecting the supply collector to the condensate receiving collector in order to define a dihedron with substantially horizontal edges, the cooling fluid being atmospheric air which enters the box via the interior of the dihedron and leaves it by a chimney or flue positioned above the bundle of tubes.

BRIEF DESCRIPTION OF THE DRAWINGS

The invention is described in greater detail hereinafter relative to two non-limitative embodiments and with reference to the attached drawings, wherein show:

FIG. 5 a vertical sectional view of part of the fast neutron nuclear reactor illustrating a second embodiment of the residual power removal device according to the invention.

FIG. 6 a vertical sectional view along line VI—VI of FIG. 5 showing the condenser of the residual power removal device shown in FIG. 5.

DETAILED DESCRIPTION OF THE PREFERRED EMBODIMENTS

Figure 1:
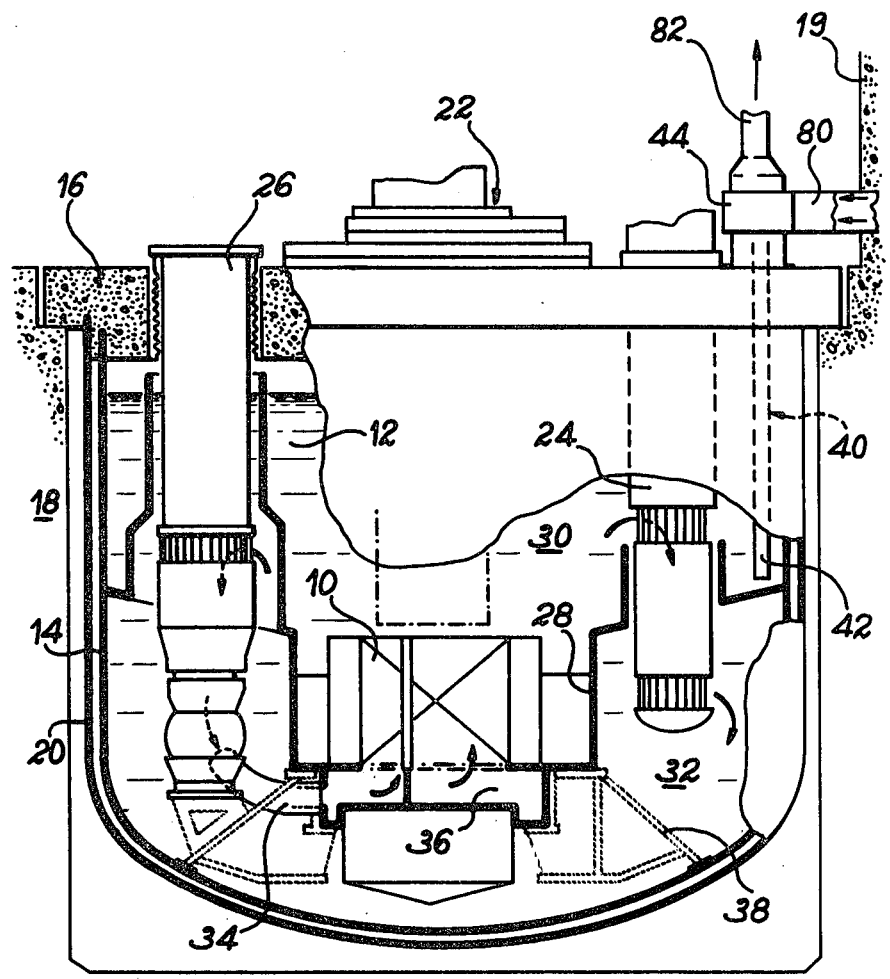
FIG. 1 a diagrammatic part cross-sectional view of a fast neutron nuclear reactor incorporating residual power removal devices constructed in accordance with a first embodiment of the invention.

FIG. 1 diagrammatically shows a fast neutron nuclear reactor of the integrated type. The reactor core 10 is immersed in a volume 12 of cooling liquid metal (normally sodium) contained within a vertically axed vessel 14. The upper part of vessel 14 is sealed by a horizontal sealing slab 16, which rests by its periphery on a vessel shaft 18. The main vessel 40 is duplicated within the vessel shaft 18 by a safety vessel 12 which, like vessel 14 is suspended on slab 16. The components placed above slab 16 are disposed in a confinement enclosure 19, whereof only part is shown in FIG. 1.

In reactors of the integrated type, like that diagrammatically shown in FIG. 1, slab 16 is traversed by a series of components necessary for the operation of the reactor. Thus, in its central part, the slab supports a system of rotary plugs 22 and in its peripheral part intermediate exchangers 24 and pre-vacuum pumps 26 regularly distributed around the core.

An inner vessel 28 defines within vessel 14 a "hot" collector 30 containing the "hot" liquid metal issuing into the upper end of core 10 and a "cold" collector 32 in which is collected the liquid metal leaving exchangers 24. The liquid metal is then taken up by pumps 26 in order to be passed through the pipes 34 into a support 36 ensuring both the supply of liquid metal to core 10 and the supporting of the said core on the bottom of vessel 14 by means of flooring 38. Thus, in operation, the liquid metal permanently circulates through the core. Exchangers 24 ensure the extraction of the heat given off by the fission reaction. This heat is then transferred to a not shown secondary circuit before being used in the turbines of a water/vapour or steam circuit for generating electricity.

According to the invention, in the interior of vessel 14 are also provided the evaporators 42 of the residual power removal devices 40. These devices 40, whereof only is shown in FIG. 1, pass through slab 16 and make it possible, in the case of a stoppage of the pre-vacuum pumps 26, to ensure an appropriate cooling of the hot liquid metal contained in collector 30, so as to remove the residual power of the reactor.

Figure 2:
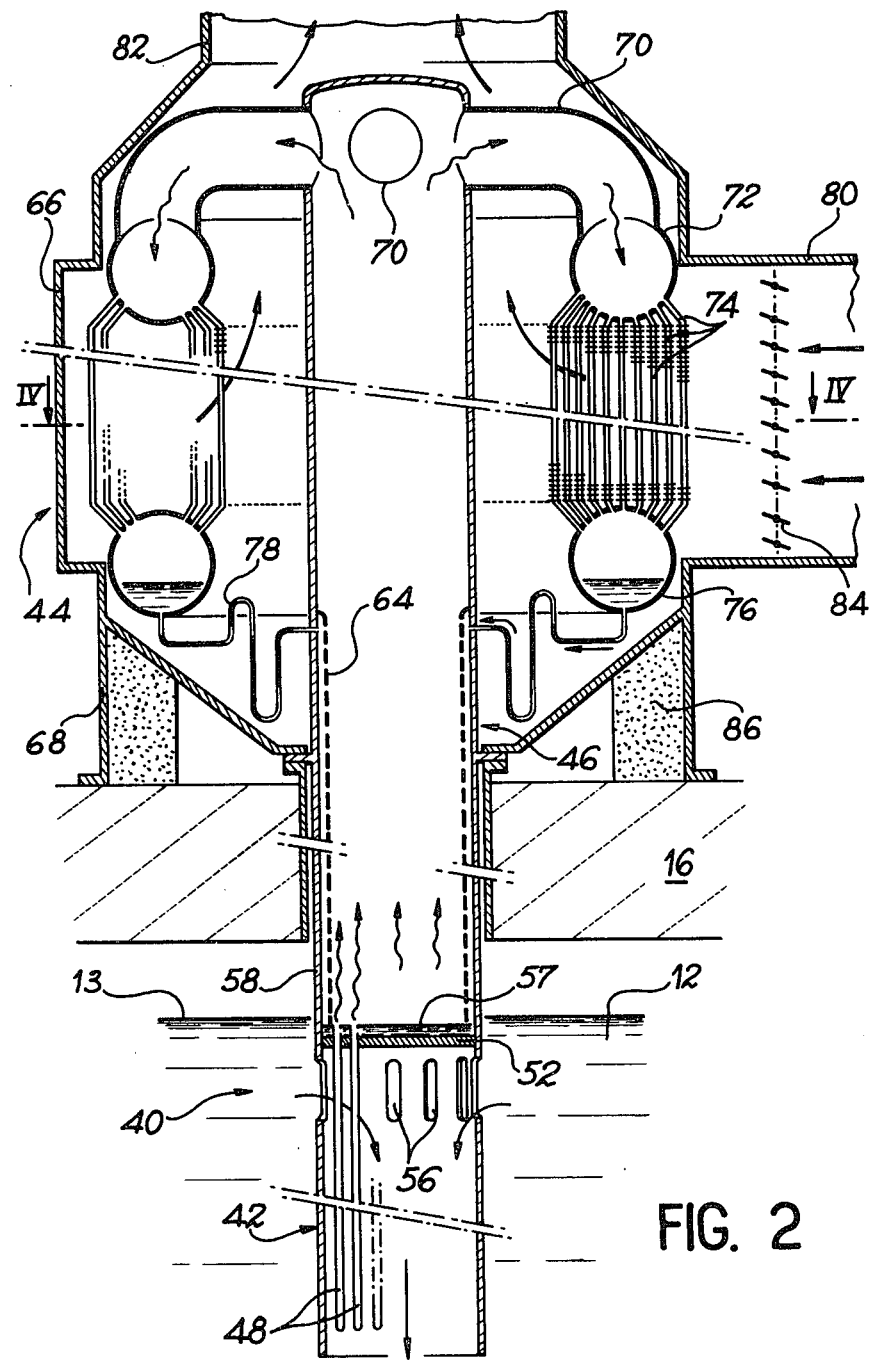
FIG. 2 a larger scale vertical sectional view illustrating a detail of one of the residual power removal devices equipping the reactor of FIG. 1.

FIG. 2 illustrates on a larger scale the constructional details of one of the devices 40. Each of the devices 40 comprises an evaporator 42 positioned below slab 16 and immersed in liquid metal 12, a condenser 44 positioned above slab 16 and within the reactor enclosure 19 (FIG. 1) and an adiabatic collector 46 passing through slab 16 to link evaporator 42 with condenser 44.

Figure 3:
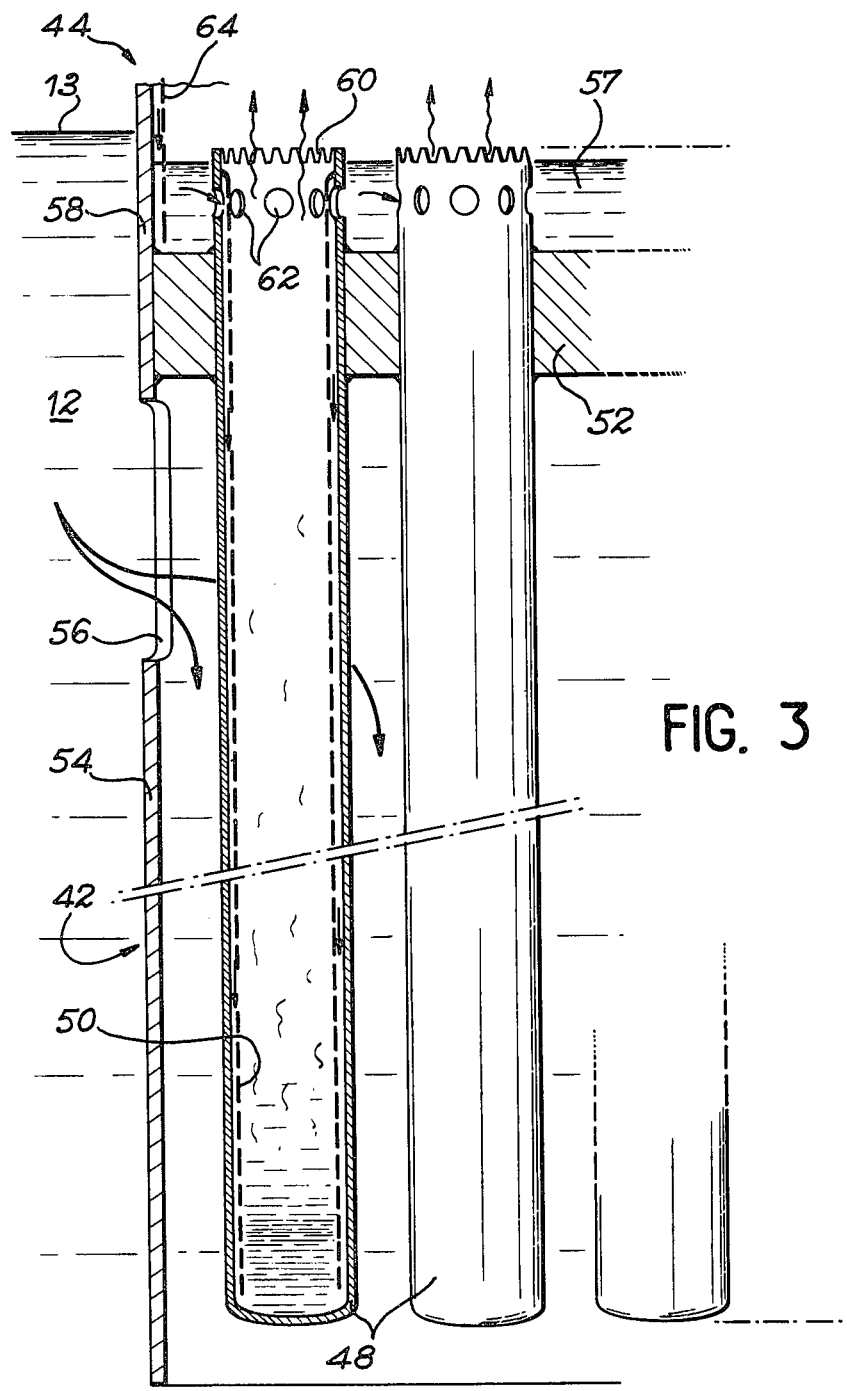
FIG. 3 an even larger scale vertical sectional view showing the detail of the fixing of the tubes of the evaporator of the device of FIG. 2.

As is more clearly shown in FIGS. 2 and 3, the evaporator 42 comprises a bundle of straight, vertical tubes 48 sealed at their lower end so as to have a glove finger-like configuration. Tubes 48 are entirely positioned below the free level 13 of liquid metal 12. In order to ensure, in the manner described hereinafter, the piping of the liquid phase of the heat transfer fluid contained in device 40, the inner wall of each of the tubes 48 is covered with a capillary structure 50. Each of the tubes 48 is fixed in the vicinity of its upper open end to a horizontal tube plate 52, which at the same time defines the lower end of adiabatic collector 46. Obviously, this fixture takes place in a tight manner, e.g. by welding.

Evaporator 42 also comprises a ferrule 54 welded to the tube plate 52 and surrounding the bundle of tubes 48. Ferrule 54 serves to pipe or channel the flow of liquid metal 12 around tubes 48. For this purpose, in its upper part in the vicinity of tube plate 52, ferrule 54 has inlet ports 56 and is open in its lower part. Thus, it establishes a flow of liquid metal 12 by a thermosiphon effect between ports 56 and the lower opening of said ferrule. In the same way, this configuration of ferrule 54 enables it to freely downwardly expand at the same time as tubes 48.

It can be seen in FIG. 3 that the upper end of each of the tubes 48 projects above the tube plate 52 by a given height. This feature makes it possible to define a buffer reservoir 57 in the lower part of a vertical pipe 58, which extends ferrule 54 above tube plate 52 to define the adiabatic collector 44.

The buffer reservoir 57 formed in this way above the tube plate 52 also constitutes the supply overflow for the capillary structure lining the interior of each of the tubes 48. As is illustrated in FIG. 3, the uniform distribution of the flow of heat transfer fluid in the liquid state in each of the tubes can be obtained by making sawtooth-like slits 60 at the upper end of each of the tubes and by making a row of holes 62 in the side wall of the tubes. Obviously, these two solutions can be separated from one another, i.e. the upper end of each of the tubes can be provided with slits like slits 60, or can be provided with holes like holes 62.

On referring once again to FIG. 2, it can be seen that the existence of the adiabatic collector 46, constituted by pipe 58 is imposed by the distance separating the free level 13 of the liquid metal contained in the vessel and below which must be positioned evaporator 42 from the entrance into condenser 44 positioned above slab 16. In the said collector, the flow of the heat transfer fluid in the vapour phase undergoes an inevitable pressure drop, which reduces the axial flow. In order to reduce this pressure drop to the greatest possible extent and reduce the diameter of the passage through slab 16 by collector 46, it has been chosen in the manner indicated hereinbefore to connect the tubes 48 of evaporator 42 to a single condenser 44 via a single vertical pipe 58 ensuring the collection of the vapour or steam reduced in tubes 48. This solution significantly reduces the pressure drops in the adiabatic collector in a minimum proportion of 20% compared with other possible solutions, such as that consisting of having a group of individual heat pipes, each having an adiabatic zone and a condenser.

Preferably, the inner wall of the vertical pipe 58 is covered on its inner face by a capillary structure 64 which, like capillary structure 50 of each of the tubes 48, makes it possible to prevent entrainments of the heat transfer fluid in the liquid phase by the gaseous phase leaving tubes 48 and regularizes the liquid film returning to evaporator 42 via buffer reservoir 57.

According to another, not shown, constructional variant, capillary structure 64 can be replaced by at least one small diameter pipe for returning the liquid to the buffer reservoir 57.

In the embodiment of the invention shown in FIG. 2, the condenser 44 comprises a caisson or box 66 resting via a cylindrical skirt 68 on the reactor slab 16. The vertical pipe 58 defining the adiabatic collector 46 is extended upwards within box 66 to issue into four bends 70, which are positioned at 90° from one another. Bends 70 drop down again towards a toroidal supply collector 72 of the actual condenser. The latter comprises fin tubes 74 distributed e.g. over 10 circular and concentric levels or layers so as to form an annular bundle. The lower ends of tubes 74 issue into a toroidal condensate-receiving collector 76, similar to collector 72 and positioned below the latter. More specifically, the ends of the tubes 74 are sealingly fixed to the collectors 72 and 76 e.g. by welding. Collectors 72 and 76, as well as the bundle of tubes 74, are arranged coaxially with respect to the vertical pipe 58.

The heat transfer fluid in the liquid phase forming in collector 76 is recycled towards the adiabatic collector 46 by bent pipes 78, which issue into pipe 58 at the upper end of the capillary structure 64 formed within the latter. FIG. 2 shows that the pipes 78 are bent in siphon-like manner, so as to form a hydraulic seal, whose developed height corresponds to the difference of the vapour pressures.

Figure 4:
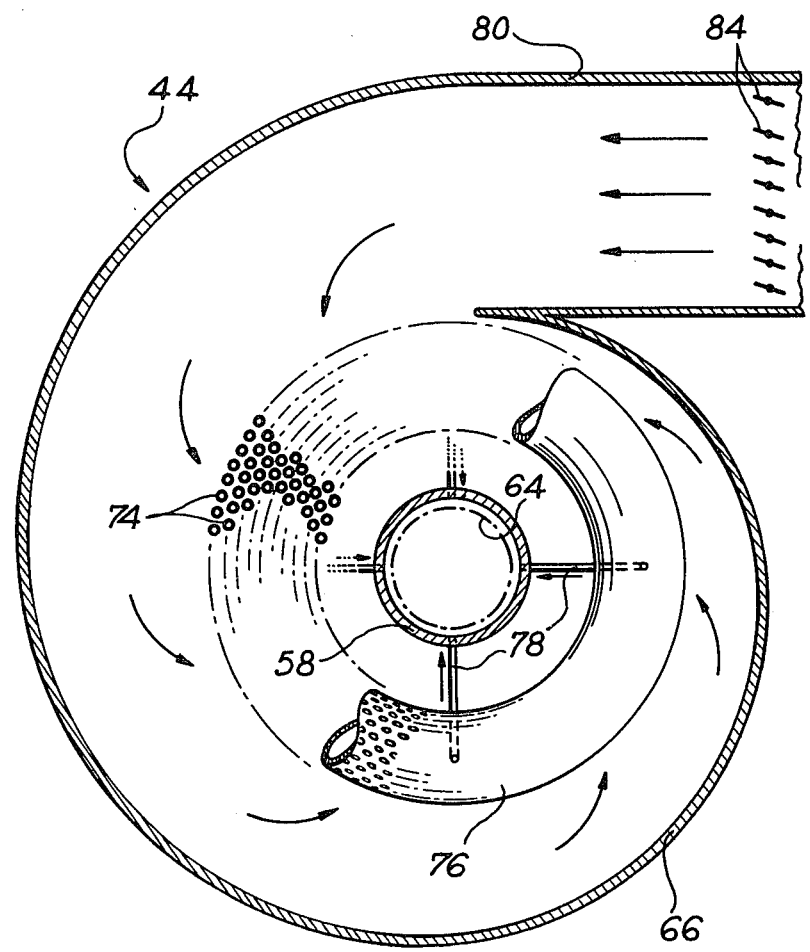
FIG. 4 a horizontal sectional view along line IV—IV of FIG. 2 showing the helix-shaped box ensuring the supply of cooling air for the condenser in the embodiment of FIG. 2.

In the embodiment shown in FIG. 2, condenser 44 is cooled by means of atmospheric air. The air is sucked into box 66 by a lateral pipe 80 under the effect of the pressure reduction created in the box by a vertical chimney or flue 82 positioned above the latter. FIG. 4 shows that the box 66 is shaped like a centrifugal fan helix level with the bundle of tubes 74, which makes it possible for the cooling air to circulate relatively homogeneously with the bundle. To permit the putting into operation or out of operation of the device shown in FIG. 2, vents 84 are positioned in the lateral pipe 80 at the entrance to box 66. Finally, a biological shield 86 is provided within the supporting skirt 68.

According to a not shown constructional variant, condenser 44 can be connected to the assembly constituted by evaporator 40 and adiabatic collector 46 by a flange joint, in such a way that the disassembly of said joint enables the evaporator to be repaired.

Preferably, the heat transfer fluid in device 40 is mercury. Preference is given to this product because of the wide temperature range in which it can be used (170° to 600° C.) its low vapour pressure (2 to 11 bars) in the considered temperature range (390° to 530° C.), the high axial heat transfer level which it permits, its dissolving in sodium in the case of a leak, as well as its radiation behaviour, when compared with other products which can be used such as potassium, sodium and sulphur.

As is illustrated by the arrows in FIGS. 2 to 4, the present device operates in the following way.

Mercury in the filled state at the bottom of tubes 48 of evaporator 42 is heated by the liquid metal 12 contained in the reactor vessel and which circulates in natural convection between inlet ports 58 and the outlet opening formed at the lower end of ferrule 54. Thus, the mercury is vaporized and rises in vertical pipe 58 in order to enter the supply collector 72 via bent pipe 70. When the device is put into operation by opening vents 84, the pressure drop created in box 66 as a result of the suction of air through chimney or flue 82, makes air circulate through the bundle of fin tubes 74, which has the effect of condensing the mercury, whose liquid phase is collected in collector 76. This liquid phase is then transferred by pipes 78 and capillary structure 64 into buffer reservoir 57, from where it drops again into each of the tubes 48 via capillary structures 50. Thus, cooling is brought about on reactor shutdown without any external mechanical energy supply, because the device functions entirely in natural convection.

Furthermore, within the maximum power limits which can be removed with condenser 44 as a function of the mercury vapour temperature, it should be noted that an increase in the vaporization temperature of the mercury and consequently the axial power transferred corresponds to any increase in the temperature of the liquid metal 12 within the vessel. Thus, the device is self-regulating.

In the embodiment described with reference to FIGS. 2 to 4, reactor enclosure 19 (FIG. 1) must be traversed by large-size air ducts in the form of supply pipe 80 and flue 82. Moreover, the dimensions of condenser 44 above slab 16 are relatively large as a result of the presence of other components.

To obviate these disadvantages, FIGS. 5 and 6 show a second embodiment of the invention, which differs from the embodiment of FIGS. 2 to 4 through the different design of the condenser and through the arrangement of said condenser outside the reactor enclosure. For simplification purposes, the same reference numerals, increased by 100, are used for designating the same elements as in the first embodiment.

FIG. 5 shows the right-hand part of the reactor vessel shown in FIG. 1 and it is possible to see the main vessel 114 containing liquid metal 112, the safety vessel 120 duplicating the main vessel 114, slab 116 which supports vessels 114 and 120 and whose peripheral edge rests on the vessel shaft 118, internal vessel 128 separating the hot collector 130 from the cold collector 132, as well as a heat exchanger 124.

FIG. 5 also shows a residual power removal device 140 comprising an evaporator 142 immersed in the liquid metal 112, a condenser 144 positioned above slab 116 and outside reactor building 119 in this embodiment, as well as the adiabatic collector 146. Evaporator 142 and adiabatic collector 146 are identical to those described relative to the first embodiment.

However, apart from its positioning outside enclosure 119, condenser 114 is of a different design to that of the preceding embodiment. Thus, although this condenser also has a box 166 resting via a ferrule 168 on the structure of the vessel shaft 118 and although the cooling air is supplied and removed by means of a lateral pipe 180 and a flue 182, it can be seen that the actual condenser is formed by two planar bundles of fin tubes 174 (FIG. 6), arranged in accordance with a dihedron having a horizontal edge or an edge which is inclined slightly relative to the horizontal. The edge of the thus formed dihedron is materialised by the vapour supply pipe 188, which extends the pipe 158 constituting the adiabatic collector 146 and traverses enclosure 119 in order to enter box 166. This supply pipe 188 is linked with two supply collectors 172 into which issues the upper end of each of the bundles of tubes 174. The lower end of these bundles issues into the condensate-receiving collectors 176. Like pipe 188, collectors 172 and 176 are rectilinear and substantially horizontal. More specifically, it can be seen in FIG. 6 that collectors 176 are positioned ebelow the supply collectors 172 and on either side of the vertical plane passing through pipe 188. Moreover, the collectors 172, 176, as well as the tube bundles 174 are arranged substantially symmetrically with respect to said plane.

Obviously, as in the first embodiment, collectors 176 are connected to pipe 158 within the capillary structure of the latter by siphon-like bent pipes 178. As is shown in FIGS. 5 and 6, the air supply by pipe 180, after opening vents 184, takes place by means of the dihedron formed by tubes 174, so as to aid natural convection. Thus, the air passes through the tube bundles before escaping through flue 182.

Obviously, the invention is not limited to the embodiments described in exemplified manner hereinbefore and in fact covers all variants thereof. Thus, it is readily apparent that the fluid cooling condenser 144 is not limited to atmospheric air or even to gases and could optionally be water, although the safety function which must be fulfilled by the devices for cooling the reactor on shutdown make it preferable to carry out cooling by atmospheric air.

In the same way, it is obvious that the arrangements of the condensors described with reference to FIGS. 2 to 4 and FIGS. 5 to 6 can optionally be reversed. Thus, it would be possible to place within the reactor enclosure a condenser of the type described with reference to FIGS. 5 and 6. Conversely, it would also be possible to place outside the enclosure a condenser of the type described with reference to FIGS. 2 to 4.

Finally, it is obvious that this residual power removal device can be used both in a loop-type reactor and in an integrated reactor.

I claim:

1. A fast neutron nuclear reactor comprising a vertically axed vessel containing the reactor core and a volume of liquid metal for cooling the same, a horizontal sealing slab sealing the upper part of the vessel, at least one pre-vacuum pump and at least one heat exchanger respectively ensuring in operation the circulation of the liquid metal in the core and its cooling, as well as at least one device for removing the residual power ensuring the cooling of the liquid metal in the case of a stoppage of the pre-vacuum pumps, wherein the residual power removal device comprises an evaporator incorporating a bundle of tubes in glove finger-like form immersed in the liquid metal, so as to pass into the vapour phase a heat transfer fluid initially in the liquid phase, an adiabatic collector of said vapour phase incorporating a pipe traversing the reactor slab and a condenser in which the heat transfer fluid in the vapour phase exchanges its heat with an external cooling fluid and condenses in the liquid phase before dropping again into the evaporator by the adiabatic collector and wherein the wall of the pipe constituting the collector, as well as the wall of each of the tubes of the evaporator internally have a capillary structure piping the heat transfer fluid in the liquid phase.

2. A nuclear reactor according to claim 1, wherein the heat transfer fluid is mercury.

3. A reactor according to claim 1, wherein the condenser comprises a caisson or box in which are located at least one substantially horizontal and rectilinear supply collector connected to the upper end of the pipe constituting the adiabatic collector, two condensate receiving collectors positioned below the supply collector and on either side of the vertical plane passing through the latter and two planar bundles of fin tubes connecting the supply collector to the condensate receiving collector in order to define a dihedron with substantially horizontal edges, the cooling fluid being atmospheric air which then enters the box via the interior of the dihedron and leaves it by a chimney or flue positioned above the bundle of tubes.

4. A nuclear reactor according to claim 1, wherein the upper end of the bundle of tubes is installed on a tube plate constituting the lower end of the adiabatic collector and the upper end of each of the tubes projects over a given height above the tube plate in order to define a buffer reservoir for the heat transfer fluid in the liquid phase.

5. A nuclear reactor according to claim 4, wherein the upper end of each of the tubes projecting above the tube plate has at least one row of slits and/or holes on its periphery.

6. A reactor according to claim 1, wherein the evaporator also has a ferrule surrounding the bundle of tubes, which is open at its lower end and has at least one inlet port at its upper end.

7. A reactor according to claim 1, wherein the condenser is supported by the reactor slab and is located in the reactor enclosure.

8. A reactor according to claim 1, wherein the condenser is positioned externally of the reactor enclosure.

9. A reactor according to claim 1, wherein the condenser comprises a caisson or box in which are located a toroidal supply or feeding collector connected to the upper end of the pipe constituting the adiabatic collector, a toroidal collector for receiving the condensate positioned below the supply collector and an annular bundle of fin tubes connecting the supply and condensate receiving collectors, the external cooling fluid being atmospheric air which enters the box by a lateral pipe and leaves it by a chimney or flue positioned above the supply collector.

* * * * *